(12) United States Patent
Koziara et al.

(10) Patent No.: US 7,746,026 B2
(45) Date of Patent: Jun. 29, 2010

(54) CONTROLLING STATE OF CHARGE OF A VEHICLE BATTERY

(75) Inventors: Christopher Richard Koziara, Oxford, MI (US); Daniel Navarro Rios, Royal Oak, MI (US); Bernd Spier, Troy, MI (US); Kenneth Joseph Wenzel, Farmington Hills, MI (US)

(73) Assignees: Chrysler Group LLC, Auburn Hills, MI (US); Daimler AG, Stuttgart (DE)

( * ) Notice: Subject to any disclaimer, the term of this patent is extended or adjusted under 35 U.S.C. 154(b) by 251 days.

(21) Appl. No.: 11/615,081

(22) Filed: Dec. 22, 2006

(65) Prior Publication Data

US 2008/0150490 A1 Jun. 26, 2008

(51) Int. Cl.
*H02J 7/00* (2006.01)
*H02J 7/14* (2006.01)

(52) U.S. Cl. .................. 320/104; 320/132; 324/426; 324/436

(58) Field of Classification Search .......... 320/104, 320/132; 324/426–436
See application file for complete search history.

(56) References Cited

U.S. PATENT DOCUMENTS

| 4,961,151 | A | | 10/1990 | Early et al. |
| 5,598,084 | A | * | 1/1997 | Keith .......................... 320/109 |
| 5,659,240 | A | | 8/1997 | King |
| 6,133,707 | A | * | 10/2000 | Kikuchi et al. ............... 320/104 |
| 6,333,620 | B1 | | 12/2001 | Schmitz et al. |
| 6,344,732 | B2 | * | 2/2002 | Suzuki ........................ 320/132 |
| 6,583,599 | B1 | | 6/2003 | Phillips et al. |
| 6,841,972 | B2 | | 1/2005 | Koo |
| 6,950,320 | B2 | * | 9/2005 | Shin ........................ 363/21.15 |
| 2004/0108831 | A1 | * | 6/2004 | Cartwright et al. .......... 320/104 |
| 2006/0033469 | A1 | * | 2/2006 | Beaty et al. ................. 320/104 |

* cited by examiner

*Primary Examiner*—Edward Tso
*Assistant Examiner*—Samuel Bernhanu
(74) *Attorney, Agent, or Firm*—Ralph E. Smith (57) ABSTRACT

A method of controlling a state of charge of a battery in a vehicle includes receiving a request to enter an enhanced charging mode. A target for the state of charge is increased from a normal operating target to at least one enhanced mode target. The state of charge may be controlled to the at least one enhanced mode target during a drive charging cycle and during a park charging cycle.

20 Claims, 4 Drawing Sheets

CONTROLLING STATE OF CHARGE OF A VEHICLE BATTERY

FIELD OF THE INVENTION

This invention relates generally to battery charging and more particularly to battery charging modes in vehicles.

BACKGROUND OF THE INVENTION

Vehicles commonly have an engine and a battery for storing a charge used to start the engine. In hybrid electric vehicles, the battery may also be used to power one or more electric motors. Generally, an idle battery will lose its charge over time. This is generally not a concern for drivers who use their vehicle on a regular basis because almost all vehicles contain a battery charging system to recharge the battery while driving.

But it is possible for a battery to remain idle too long so that it reaches a charge level, known as a state of charge, that is too low to start the engine. For example, a battery in a vehicle parked for many weeks may reach a state of charge too low to start the vehicle. Likewise, a newly manufactured vehicle may be shipped a long distance, such as overseas, allowing the sate of charge of the battery to drop too low to start the vehicle at its destination. Therefore, it may be desirable to increase the time that a battery remains idle yet provides sufficient power to start the engine after that time.

Likewise, some vehicle operations, such as racing a hybrid electric vehicle or providing electrical power to on-board or off-board electrical equipment, require a level of electrical charge greater than that required for normal vehicle operation. Therefore, it may be desirable to increase the amount of power available from the battery for those operations.

SUMMARY OF THE INVENTION

In one implementation, a method of controlling a state of charge of a battery in a vehicle includes receiving a request to enter an enhanced charging mode. The enhanced charging mode includes a drive charging cycle and a park charging cycle. A target for the state of charge is increased from a normal operating target to at Least one enhanced mode target. The state of charge is controlled to the at least one enhanced mode target during the drive charging cycle and/or during the park charging cycle.

BRIEF DESCRIPTION OF THE DRAWINGS

The following detailed description of preferred implementations and best mode will be set forth regard to the accompanying drawings in which.

DETAILED DESCRIPTION OF PREFERRED IMPLEMENTATIONS

Figure 1:
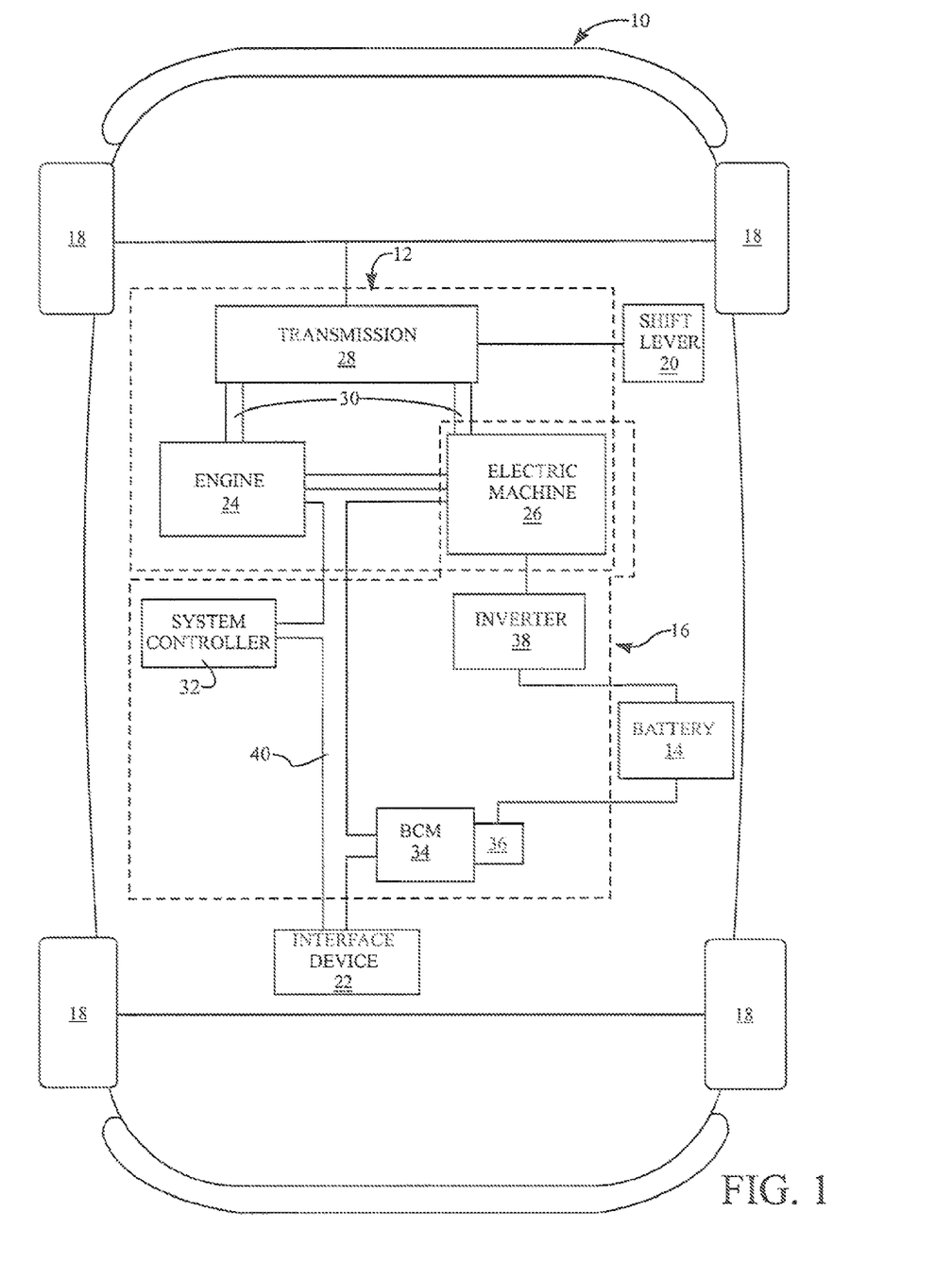
FIG. 1 is a block diagram schematically illustrating an implementation of a battery control system.

Referring in more detail to the drawings, FIG. 1 illustrates a vehicle 10, such as a hybrid electric vehicle. The vehicle 10 includes a powertrain system 12 for propelling the vehicle 10, a battery 14 for providing power to the powertrain system, and a charging system 16 to charge the battery. The vehicle 10 also includes wheels 18 driven by the powertrain system 12, a shift lever 20 to enable a driver to interface with the powertrain system, and an interface device 22 to enable a driver to interface with the charging system 16.

The powertrain system 12 generates mechanical power to drive the vehicle wheels 18. The powertrain system 12 includes a transmission 28 mechanically coupled to the wheels 18 in any suitable manner for providing a mechanical advantage, an internal combustion engine 24 to power the transmission, an electric machine 26 also for powering the transmission and of charging the battery 14, and a drive train 30 for connecting the engine and the electric machine to the transmission. The engine 24 and the electric machine 26 drive the wheels 18 via the transmission 28 through the drive train 30. In one implementation, the electric machine 26 may be integral with the transmission 28. The electric machine 26 may operate as a motor to drive the wheels 18, or it may act as a generator, converting mechanical power from the engine 24 into electrical power. Although FIG. 1 shows the powertrain system 12 configured for a hybrid electric vehicle, the powertrain system may be configured for a non-hybrid electric vehicle having an internal combustion engine, a transmission, and a drive train but not an electric motor.

The battery 14 cooperates with the electric machine 26. For example, the battery 14 provides electrical power to the electric machine 26 when the electric machine 26 operates as a motor. Also, the battery 14 receives power from the electric machine 26 to recharge the battery 14 when the electric machine 26 operates as a generator.

The charging system 16 provides electrical power to the battery 14 to recharge the battery. The charging system 16 may include the electric machine 26 to convert mechanical power into electrical power, a system controller 32 to control the charging system 16, and a battery control module 34 for monitoring and controlling the battery 14. In an alternative implementation, the charging system 16 on a non-hybrid electric vehicle may include an alternator for charging the battery 14 instead of the electric machine 26. In yet another implementation, the system controller 32 and the BCM 34 may be combined into a single controller. Moreover, each controller may be divided into more than one controller to provide the functionality described below. The charging system 16 may also include any suitable sensors 36 for detecting battery conditions and an inverter 38 to convert the electrical power from AC to DC and vice versa.

The electric machine 26 may operate to convert mechanical power from the engine 24 or transmission 28 into electrical power for the battery 14. The electric machine 26 may generate an AC voltage. The inverter 38 may convert an AC voltage generated by the electric machine 26 into a DC voltage for charging the battery 14. Conversely, the inverter 38 may convert a DC voltage from the battery 14 into an AC voltage for use by the electric machine 26.

The system controller 32 controls the operation of the engine 24 and the electric machine 26. The system controller 32 determines whether to drive the wheels 18 using the engine 24, the electric machine 26, or both. The system controller 32 makes the determination based upon one or more functions, such as the amount of mechanical power required to meet the driver's demands, the amount of power that can be provided by the engine 24 and the electric machine 26, the state of charge of the battery 14, and/or other like factors. In one implementations, the system controller 32 couples with the battery control module (BCM) 34 to obtain the battery conditions.

The BCM 34 monitors one more battery conditions, such as the state of charge, state of health, accuracy of the state of charge, and/or the like. The BCM 34 may couple with and/or include the sensors 36, such as voltage sensors, current sensors, and temperature sensors, for monitoring parameters associated with the battery conditions. For example, the BCM 34 may monitor the current output, the voltage level, and the temperature of the battery 14 to determine the state of charge. The BCM 34 may then compare the monitored values with a predictive model to determine the accuracy of the state of charge determination. Moreover, the BCM 34 may track the temperature, external climate factors, battery age, the number of recharge cycles of the battery 14, and various other factors to determine the state of health of the batter. The BCM 34 may communicate the state of charge, the accuracy of the state of charge, and the state of health through a vehicle communication bus 40.

The vehicle communication bus 40 allows multiple devices in the vehicle 10 to communicate with one another. For example, the system controller 32, the BCM 34, the interface device 22, engine 24, and electric machine 26 may all send and receive messages to one another across the bus 40.

The vehicle 10 may also include one or more interface devices 22 for the driver to interact with the charging system 16. The interface devices(s) 22 may communicate with the system controller 32 through the communication bus 40. The interface devices 22 (not separately shown) may include buttons and/or controls, a microphone, speakers, and/or a visual display, such as a heads-up display or a graphic display in the instrument panel. These devices 22 allow a user to input commands, receive audio/visual feedback, and provide voice communications. Buttons and/or controls enable a vehicle occupant to activate or engage one or more devices in the vehicle 10. For instance, an electronic push-button can be used to initiate a charging mode for the battery 14. The microphone allows an occupant to input verbal or other auditory commands. The microphone can be connected to a voice-processing device to digitize the verbal input into machine commands. The speaker provides audible output to a vehicle occupant and can be a stand-alone speaker or part of a vehicle audio system.

Method of Controlling a State of Charge of a Vehicle Battery

FIGS. 2A-2D illustrate an implementation of a method 100 of controlling a state of charge of battery 14. For example, the method 100 can be completed using the charging system 16 described above. In general, the method 100 includes receiving a request to enter an enhanced charging mode, such as from a normal operating mode. The normal operating mode sets a state of charge for the battery 14 to a normal state of charge range while the vehicle is driven. The vehicle 10 is in the normal operating mode by default. In contrast, the enhanced charging mode is a mode requested by a user (driver, operator, passenger, or the like) that increases a target for the battery 14 state of charge above the normal state of charge range. The enhanced charging mode includes a drive charging cycle and a park charging cycle. The target for the sate of charge is increased from a normal operating target to an enhanced mode target. The state of charge is controlled to the enhanced mode target during the drive charging cycle and/or during the park charging cycle.

Accordingly, the increased state of charge target enables the driver to prepare the battery 14 for long-term storage, shipping, or other specialized uses such as racing or powering external electrical devices. The increased state of charge target allows the battery 14 to remain in storage or shipping for a longer time before the state of charge decays to a level too low to start the vehicle 10. Likewise, the increased state of charge target allows the battery 14 to be used in applications that require more electrical power than normal vehicle operations, such as racing or powering external devices, such as power tools.

Figure 2A:
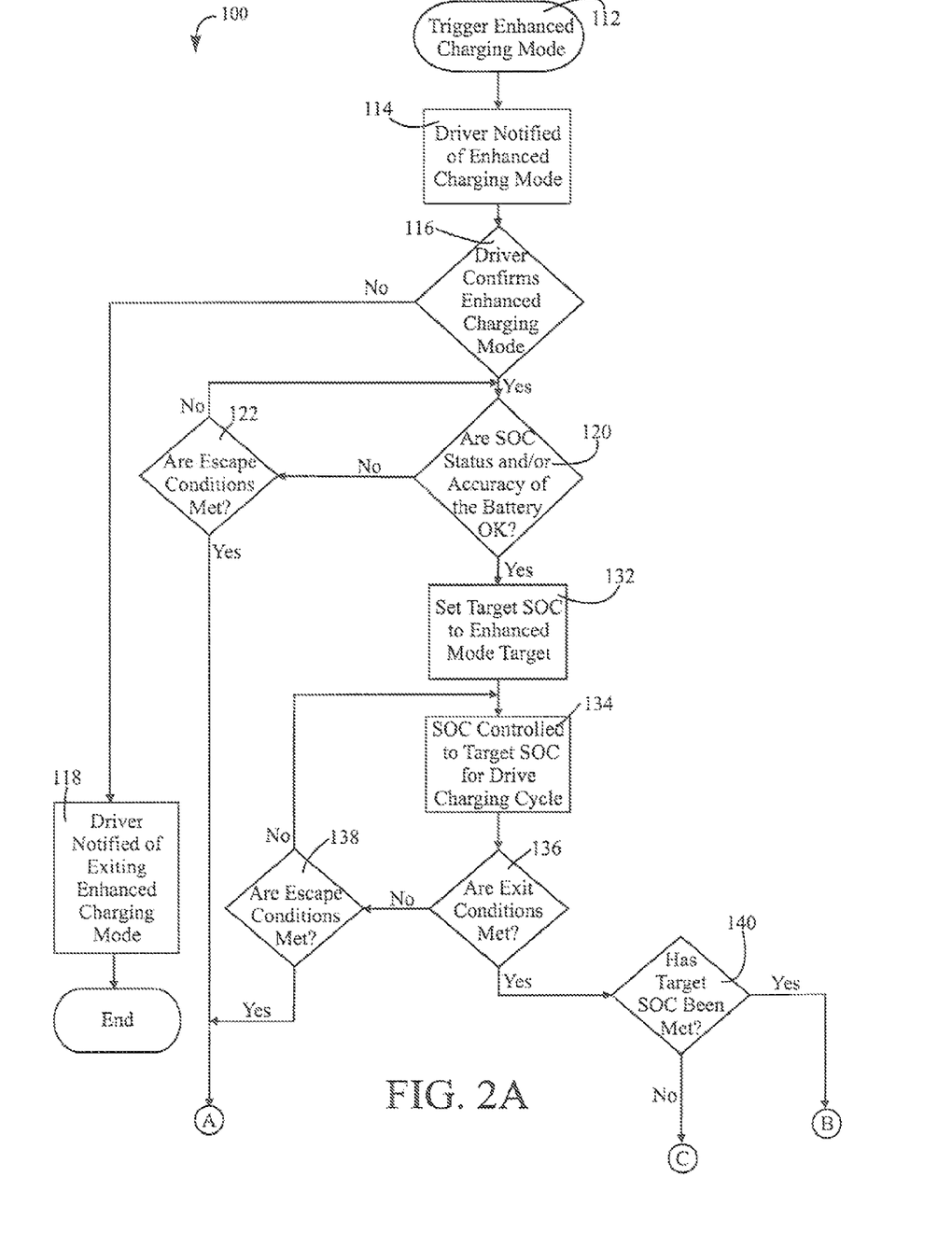
FIG. 2A-2D are flowcharts illustrating an implementation of a method of controlling a state of charge of a vehicle battery.

According to this particular implementations, the method 100 begins at step 112 by receiving a request to enter the enhanced charging mode from a driver, operator, passenger, or user of a vehicle. For example, the driver may request to enter the enhanced charging mode using interface device 22 on the vehicle 10. As such, the driver may enter the request by pushing a button, entering a menu selection, providing a voice command to a microphone, or any other type of interface device 22.

At step 114, the driver is notified that a vehicle has received the request and that it is entering the enhanced charging mode. For example, the notification may be displayed on the interface device 22, such as on a radio, on the instrument cluster, or any other display. Alternatively, the notification may be played over a sound system such as a voice output or a non-verbal confirmation sound, such as a chime.

In step 116, a vehicle may wait for confirmation from the driver before entering the enhanced charging mode. Fore example, the system controller 32 may set a timeout that will expire after a predetermined time. If the driver does not confirm to enter the enhanced charging mode before the expiration of the timeout, then the method 100 proceeds to step 118. If the driver does confirm to enter the enhanced charging mode before the expiration of the timeout, then the method 100 proceeds to step 120. The driver may confirm to enter the enhanced charging mode by providing the request using the interface device 22 as described above.

At step 118, the enhanced charging mode is exited and the driver is notified. For example, the interface device 22 may notify the driver that the vehicle 10 is exiting the enhanced charging mode.

At step 120, a state of charge of a vehicle battery is monitored as well as an accuracy of the battery's state of charge to see if they are within acceptable ranges. For example, the BCM 34 may monitor the temperature, the voltage, and the current output of the battery 14 and determine the state of charge based on the parameters. The BCM 34 may also determine the accuracy of the state of charge status. For example, the BCM 34 may monitor the voltage, current, and environmental parameters related to the battery 14. The environmental parameters may include battery operating temperature, battery storage temperature, battery age, number of charging cycles of the battery, etc. The BCM 34 verifies that one or more of the parameters are within acceptable ranges by comparing the parameters to a state of charge model of the battery 14. Any suitable state of charge model may be used to predict the state of charge based upon the voltage, current, and/or environment parameters. The acceptable ranges may be defined based upon the predictions of the model. If one or more of the parameters is outside the acceptable range, then the accuracy of the state of charge may be determined to be low.

The BCM 34 communicates the state of charge and the accuracy to the system controller 32. The system controller 32 may determine whether the state of charge and the accuracy are within acceptable ranges for entering the enhanced charging mode. The state of charge of the battery 14 is preferably neither too high nor too low in order to enter the enhanced charging mode.

A state of charge below the normal operating range may indicate that the battery 14 is not able to handle a high charge capacity or may indicate that the battery 14 has had its state of charge reduced recently due to vehicle demands. Therefore, the system controller 32 may not allow the vehicle 10 to enter the enhanced charging mode at this time. In one implementation, the system controller 32 monitors the state of charge from the BCM 34 to see if the state of charge improves. If the BCM 34 determines that the state of charge is improving, the system controller 32 may wait to enter the enhanced charging mode until the state of charge has reached the acceptable range.

Likewise, a state of charge above the acceptable range may indicate that the charge of the battery 14 is near full capacity. In one implementation, system controller 32 does not enter the enhanced charging mode when the state of charge is above the acceptable range because the state of charge is already elevated. In another implementation, the system controller 32 continues to monitor the state of charge and enters the enhanced charging mode when the state of charge returns to the acceptable range.

The acceptable range for the accuracy of the state of charge may be similar to the accuracy needed to operate the vehicle under normal operating conditions, or may be narrower. If the state of charge and/or the accuracy of the state of charge is not within an acceptable range the method 100 proceeds to step 122. If the state of charge and the accuracy of the state of charge are within acceptable ranges the method 100 proceeds to step 132.

At step 122, it is determined whether any escape conditions exist. Escape conditions may be driver induced, system constraints, or any other condition that requires the vehicle 10 to abort the enhanced charging mode. Examples of operator inducted escape include requesting to exit the enhanced charging mode, turning off the ignition or other conditions that indicate to the controller that the operator wishes to exit the enhanced charging mode. System constraints may include a high battery temperature, a system failure, or a change in a parameter (e.g. the state of charge) that takes the parameter outside the acceptable range. In one implementation, the state of charge or accuracy outside the acceptable ranges in step 120 will not be considered escape conditions until after the state of charge or accuracy has been monitored for a predetermined period and the system controller 32 determines that it will not enter the acceptable range.

If no escape conditions exist, the method 100 may return to step 120 and continue to monitor the state of charge and the accuracy. If escape conditions do exist, the method 100 proceeds to step 124.

Figures 2B, 2C:
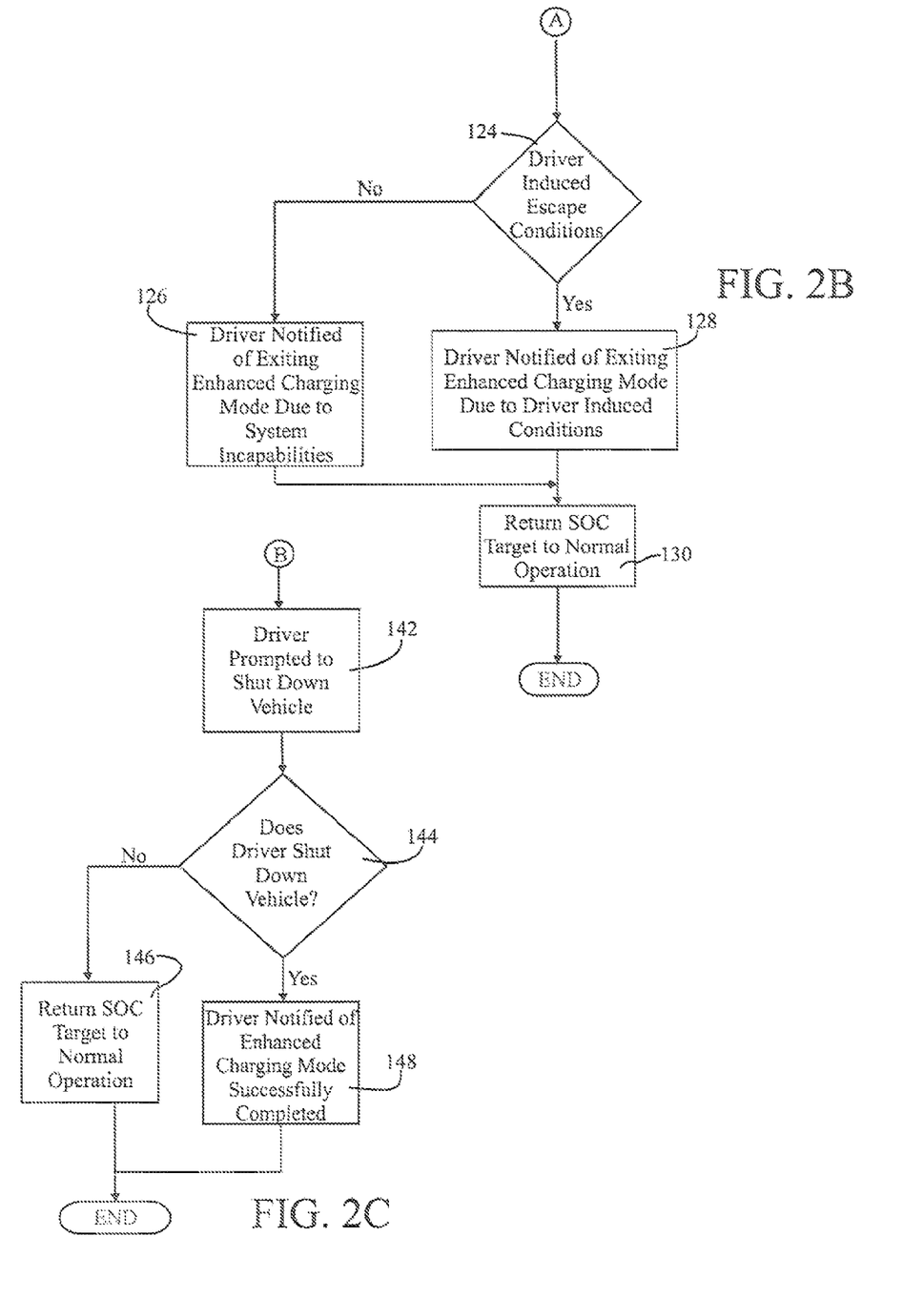

At step 124 of FIG. 2B, it is determined whether the escape conditions are operator induced. For example, if the system controller 32 determines that the escape conditions are not operator induced, the method 100 proceeds to step 126. If the escape conditions are operator induced, the method 100 proceeds to step 128.

At step 126, the driver is notified that the enhanced charging mode is being exited due to system incapability. For example, the system controller 32 may transmit any suitable signal to the interface device 22. The method 100 proceeds to step 130.

At step 128, the driver is notified that the enhanced charging mode is being exited. For example, the system controller 32 may transmit any suitable signal to the interface device 22. The method 100 proceeds to step 130.

At step 130, the target for the state of charge is set to the normal operating target. For example, the vehicle 10 returns to the normal operating mode and the method ends.

At step 132 shown in FIG. 2A, the target state of charge is set to an enhanced mode target and a drive charging cycle of the enhanced charging mode is entered. The enhanced mode target is a value or range of values for the state of charge greater than the normal operating target. The normal operating target is the typical range of the state of charge during normal vehicle operation. The normal operating target may range from a desired minimum to a desired maximum. For example, the typical state of charge during normal operation could range from about thirty percent to about seventy percent of full capacity. The enhanced mode target may include a state of charge greater than the desired maximum for the normal operating target and up to full capacity of the battery 14. For example, the enhanced mode target could range between about seventy percent and full capacity of the battery 14.

The system controller 32 may set the enhanced mode target to the same value or range of values each time the vehicle 10 enters the enhanced charging mode, or may set the target based upon the amount of charge needed in the battery 14. For example, if the vehicle 10 is going to be stored for a long period and, thereafter, is going to be started in cold temperatures, the system controller 32 may set a higher enhanced mode target for the battery 14 than if the vehicle is going to be started in warm temperatures. The additional charge may be helpful because generally more electrical power is required to start vehicles in cold temperatures. It takes longer for the charge in a battery with a high state of charge to decay during long periods of nonuse, such as during storage, shipping, or long-term parking, than it does for the charge in a battery with a lower state of charge to decay. Moreover, a higher state of charge may enable the vehicle to perform operations that require more electrical power than normal vehicle operations, such as racing or powering external devices, such as power tools.

At step 134, the sate of charge is controlled to the enhanced mode target during the drive charging cycle. In the drive charging cycle, the driver proceeds to operate the vehicle 10 as usual while driving to a destination. As the vehicle 10 is driven, the battery 14 may charge and discharge as the electric machine 26 switches between operating as a generator and a motor. But eventually the battery 14 reaches the target state of charge if driven long enough. In a hybrid electric vehicle, for example, the powertrain controller 12 may attempt to reduce the vehicle's reliance on the electric machine 26 and may attempt to increase the reliance on the engine 24 to propel the vehicle 10. As such, the system controller 32 can reduce the amount of power drawn from the batter 14 by the electric machine 26 and increase the amount of charge in the battery 14 by using the electric machine as a generator.

At step 136, the presence of exit conditions are monitored. Exit conditions are conditions that indicate to the system controller 32 to exit the drive charging cycle. For example, exit conditions may include an indication that the driver has arrived at a programmed destination using a GPS navigation system within the vehicle 10. Further exit conditions may include detecting that the transmission 28 has been shifted into park, such that the shift lever 20 has been shifted out of a driving gear and into neutral or park. Driving gears may include drive, first gear, second gear, third gear, etc. Other exit conditions can include an indication form the driver that they have arrived at their destination, such as by communicating through the interface device 22. In one implementation, the state of charge reaching the enhanced mode target may be an exit condition. The system controller 32 may monitor for exit conditions once, more than once, or periodically. If no exit conditions have been detected, the method 100 proceeds to step 138. If an exit condition has been detected, the method 100 proceeds to step 140.

At step 138, it is determined whether an escape condition is detected. For example, if the system controller 32 detects an escape condition, then the method 100 follows the step as shown in FIG. 2B and described above. If no escape conditions are detected, then the method 100 proceeds back to step 134 to continue to control the state of charge to the enhanced mode target.

At step 140, it is determined whether the state of charge has reached the enhanced mode target. For example, if the system controller 32 determines that the state of charge has reached the enhanced mode target, the method 100 proceeds to step 142 shown in FIG. 2C. If the state of charge has not reached the enhanced mode target, the method 100 proceeds to step 150 shown in FIG. 2D.

As step 142 shown in FIG. 2C, the driver is prompted to turn off the vehicle's ignition. For example, the system controller 32 may prompt the driver by using one of the interface devices 22 such as by displaying the request on the radio, on the instrument cluster, providing a voice or sound output using the sound system, or through any other type of device or method. The system controller 32 may also set a timeout to expire after a predetermined period.

At step 144, it is determined whether the ignition has been turned off. For example, the system controller 32 may make the determination based upon expiration of the timeout or by detecting a change in the state of the ignition. If the ignition is not turned off prior to expiration of the timeout, the method 100 proceeds to step 146. If the ignition is turned off prior to expiration of the timeout, the method 100 proceeds to step 148.

At step 146, the state of charge target is returned to the normal operating target and the enhanced charging mode is exited. The method 100 ends.

At step 148, the driver is notified that the enhanced charging mode is being exited. For example, the notification may be provided using the interface devices 22 or through other suitable methods. The method 100 ends.

Figure 2D:
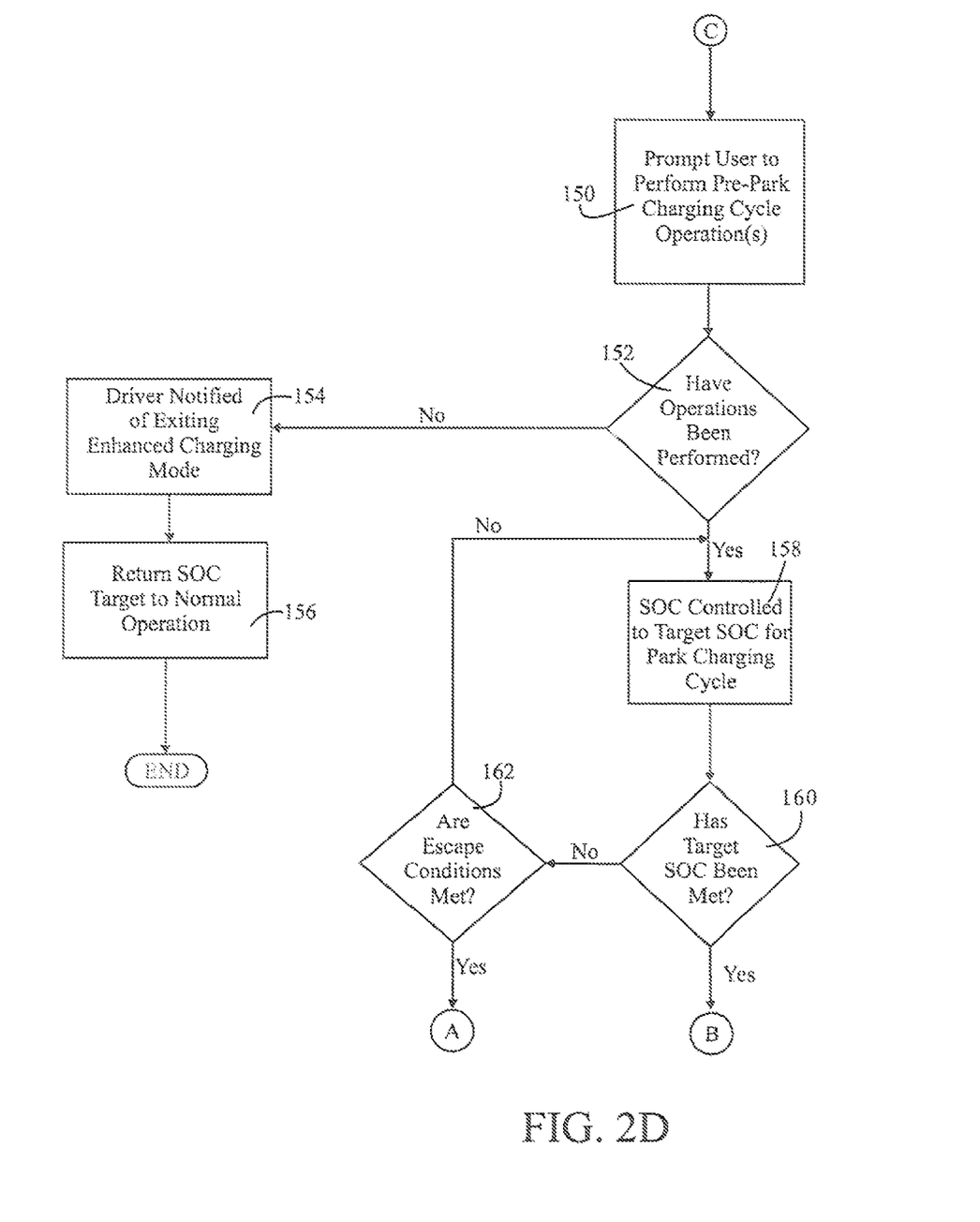

Referring now to step 150 of FIG. 2D, the drive charging cycle is exited and the park charging cycle of the enhanced charging mode is prepared. For example, the system controller 32 may prompt the driver to perform on or more pre-park charging cycle operations. The operations prepare the vehicle 10 to enter the park charging cycle to continue charging the battery 14 while the vehicle is stationary. In one implementation, the system controller 32 prompts the driver to activate the vehicle's park brake and place the transmission 28 in neutral. In another implementation, the system controller 32 prompts the driver to activate the brake pedal and place the transmission 38 into park. Once the transmission 28 is in park, the system controller 32 may inform the driver that they may release the brake pedal. The system controller 32 may prompt the driver by using one of the interface devices or methods described above. The system controller 32 may also begin a timeout having a predetermined expiration period.

At step 152, it is determined whether the pre-park charging cycle operations are completed. For example, the system controller 32 may determine whether the driver has performed the pre-park charging cycle operations by detecting an input received from the driver to confirm that the driver has performed the operations. The input may be received through the interface device 22 as described above. Alternatively, the system controller 32 may determine that the operations are completed by detecting each step of the operations or by detecting completion of a final pre-park charging cycle operation. The system controller 32 may monitor messages on the vehicle communication bus 40 from electronic modules monitoring the pre-park charging cycle operations to verify that the operation were completed. Alternatively, the system controller 32 may monitor sensors coupled with the brake pedal, park brake, etc. to verify the completion of the operations. Likewise, any other similar modes of confirming that the pre-park charging cycle operations are complete are also possible. If the system controller 32 determines that the operations have not been performed prior to expiration of the timeout, the method 100 proceeds to step 154. If they system controller 32 determines that the operations have been performed prior to expiration of the timeout, the method 100 proceeds to step 158.

At step 154, the driver is notified that the enhanced charging mode is being exited. For example, the system controller 32 may transmit any suitable signal to the interface device 22.

At step 156, the target state of charge is returned to the normal operating target and the enhanced charging mode is exited. The method 100 ends.

At step 158, the state of charge is controlled mode target may or may not be the same for the park charging cycle and the drive charging cycle. Depending on the state of charge of the battery 14 and system constraints, the charging system 16 may require anywhere from about a minute to several minutes for the state of charge to reach the enhanced mode target in the park charging cycle.

At step 160, the state of charge is monitored to determine whether the enhanced mode target has been met. For example, the system controller 32 may monitor the state of charge. If the enhanced mode target has been met, the method 100 proceeds to step 142 in FIG. 2C as described above. If the enhanced mode has not been met, the method 100 proceeds to step 162.

At step 162, it is determined whether escape conditions have been detected. For example, if escape conditions have not been detected by the system controller 32, the method proceeds back to step 158 to enable the system controller 32 to control the state of charge to obtain the enhanced mode target as described above. If escape conditions have been detected, the method 100 proceeds to step 124 shown in FIG. 2B as described above.

In another implementation, the enhanced charging mode may be entered without entering the drive charging cycle. For example, a driver may desire to prepare the battery 14 for a long-term storage and have no need to drive the vehicle. Therefore, the driver may request to enter the enhanced charging mode in step 112, and may further request to enter the park charging cycle using the interface device 22. The vehicle 10 may accept the request and prompt the user to perform the pre-park charging cycle operations.

Other operations may be performed to assist the driver with entering the enhanced charging mode. For example, the system controller 32 may store the number of times the vehicle 10 enters the enhanced charging mode. By tracking the frequency that the vehicle enters the mode, the system 16 can warn the driver if the frequency is too great. Charging batteries to a state of charge above their normal operating range can decrease the expected life of the battery 14. Therefore, the enhanced charging mode is generally used for special circumstances such as when the vehicle 10 is going to be stored or shipped for a long period or when the vehicle 10 is going to be used for a special operation that requires a higher state of charge than during normal operating conditions. As such, if the system controller 32 determines that the vehicle 10 had been operating in the enhanced charging mode recently, or several times in the past, the system controller 32 can warn the driver that entering the enhanced charging mode at this time may decrease the expected life of the batter. This may occur during driver notification in step 114.

While certain preferred embodiments have been shown and described, persons of ordinary skill in this art will readily recognize that the preceding description has been set forth in terms of description rather than limitation, and that various modifications and substitutions can be made without departing from the spirit and scope of the invention. The invention is defined by the following claims.

The invention claimed is:

1. A method of controlling a state of charge of a vehicle battery, comprising the step of:
   receiving a request to enter an enhanced charging mode including a drive charging cycle of a battery onboard a vehicle performed during driving operation of the vehicle and a park charging cycle of the vehicle battery performed while the vehicle is operating but parked;
   notifying a driver that the vehicle is entering the enhanced charging mode;
   requesting a confirmation from the driver to enter the enhanced charging mode;
   increasing a target for the state of charge of the vehicle battery from a normal operating target of the vehicle battery to at least one enhanced mode target that is greater than the normal operating target and capable of reducing vehicle battery life;
   controlling the state of charge to the at least one enhanced mode target during the drive charging cycle; and
   controlling the state of charge to the at least one enhanced mode target during the park charging cycle.

2. The method of claim 1, further comprising the step of:
   prompting the driver via an audio or visual interface device onboard the vehicle to perform operations prerequisite to entering the park charging cycle; and
   entering the park charging cycle if the operations have been performed.

3. The method of claim 2, wherein the operations include one or more of the following:
   placing a transmission in a park gear or a neutral gear;
   depressing a brake pedal; or
   activating a park brake.

4. The method of claim 1, further comprising the step of monitoring for exit conditions to exit the drive charging cycle.

5. The method of claim 4, wherein the exit conditions include one or more of:
   shifting a transmission out of a driving gear;
   receiving an input to exit a driving gear; or
   detecting a location of the vehicle at a destination.

6. The method of claim 4, further including the step of determining whether the state of charge has met the at least one enhanced mode target if one or more of the exit conditions is detected.

7. The method of claim 6, further including the step of exiting the drive charging cycle and entering the park charging cycle if the state of charge has not met the at least one enhanced mode target after an exit condition is detected.

8. The method of claim 1, wherein the request to enter the enhanced charging mode is received from a driver through an interface device in the vehicle that comprises an audio or visual interface device.

9. The method of claim 1, further comprising the step of providing a warning to the driver that vehicle battery life may be decreased.

10. The method of claim 1, wherein the normal operating target includes a state of charge ranging from a desired minimum to a desired maximum, and the at least one enhanced mode target includes a state of charge greater than the desired maximum for the normal operating target.

11. A method of controlling a state of charge of a vehicle battery according to an enhanced charging mode, comprising the steps of:
   receiving a request from an operator to enter an enhanced charging mode of a vehicle battery;
   tracking the frequency of the vehicle battery entering the enhanced charging mode and warning the operator if the frequency is too great;
   monitoring one or more acceptable conditions before enabling entry of the enhanced charging mode; and
   increasing a target for the state of charge of the vehicle battery from a normal operating target to an enhanced mode target that is greater than the normal operating target and capable of being reducing vehicle battery life if the one or more acceptable conditions are satisfied.

12. The method of claim 11, wherein monitoring the one or more acceptable conditions include at least one of the following:
   monitoring whether the state of charge of the battery is within an acceptable range; and
   monitoring whether the accuracy of a state of charge is within an acceptable range.

13. The method of claim 11, further comprising the step of monitoring output from the vehicle battery and determining the state of charge of the battery from the monitored output.

14. A method of controlling a state of charge of a vehicle battery according to an enhanced charging mode, comprising the steps of:
   receiving a request from an operator of a vehicle to enter an enhanced charging mode including a drive charging cycle;
   notifying the operator of the vehicle that the vehicle is entering the enhanced, charging mode;
   controlling the state of charge of a vehicle battery to an enhanced mode target during the drive charging cycle where the enhanced mode target that is greater than the a maximum of normal operating target where vehicle battery life is capable of being decreased;
   monitoring for one or more escape conditions for the enhanced charging mode;
   and exiting the enhanced charging mode if an escape condition is detected.

15. The method of claim 14, wherein the one or more escape conditions include at least one of the following:
   receiving an input from the operator to exit the enhanced charging mode while the vehicle is being driven;
   detecting that a vehicle ignition is off; or
   determining that there are no vehicle operating parameter constraints that prevent exiting the enhanced charging mode.

16. The method of claim 15, wherein the vehicle operating parameter constraints that permit exiting the enhanced charging mode include at least one of the following:
   a battery temperature outside an acceptable range;
   the state of charge of the battery outside an acceptable range; or
   the accuracy of the state of charge outside an acceptable range.

17. The method of claim 14, further comprising the step of determining whether acceptable conditions are satisfied, wherein the one or more acceptable conditions include at least one of the following:

the state of charge of the battery is within an acceptable range; or the accuracy of the state of charge within an acceptable range.

18. The method of claim 14, further comprising the step of determining whether the state of charge is equal to, or greater than, the enhanced mode target and entering a park charging cycle mode if the state of charge is not equal to, or greater than, the enhanced mode target.

19. The method of claim 14, further comprising the step of controlling the state of charge to the enhanced mode target during a park charging cycle.

20. The method of claim 14, further comprising the step of requesting a confirmation from the operator to enter the enhanced charging mode before entering the enhanced charging mode.

* * * * *